(12) United States Patent
Dodworth

(10) Patent No.: US 7,237,824 B2
(45) Date of Patent: Jul. 3, 2007

(54) RETRACTABLE TOP FOR A VEHICLE

(75) Inventor: Antony Dodworth, Crew (GB)

(73) Assignee: Bentley Motors Limited (GB)

( * ) Notice: Subject to any disclaimer, the term of this patent is extended or adjusted under 35 U.S.C. 154(b) by 198 days.

(21) Appl. No.: 10/491,861

(22) PCT Filed: Oct. 7, 2002

(86) PCT No.: PCT/GB02/04534

§ 371 (c)(1),
(2), (4) Date: Nov. 10, 2004

(87) PCT Pub. No.: WO03/031214

PCT Pub. Date: Apr. 17, 2003

(65) Prior Publication Data

US 2005/0077749 A1    Apr. 14, 2005

(30) Foreign Application Priority Data

Oct. 9, 2001    (GB) ................... 0124170.2

(51) Int. Cl.
*B60J 7/00*    (2006.01)
(52) U.S. Cl. .................................. 296/107.2
(58) Field of Classification Search ........... 296/107.01, 296/107.04, 107.08, 107.09, 107.14, 107.19, 296/107.2

See application file for complete search history.

(56) References Cited

U.S. PATENT DOCUMENTS

| | | | |
|---|---|---|---|
| 2,632,670 A * | 3/1953 | Crenshaw ................... 296/117 |
| 2,704,225 A | 3/1955 | Anschuetz et al. |
| 2,733,954 A * | 2/1956 | Blake, II .................... 296/117 |
| 2,812,975 A | 11/1957 | Warner |
| 3,188,135 A * | 6/1965 | Bernstein et al. ........... 296/117 |
| 3,235,303 A * | 2/1966 | McLeod et al. ............ 296/117 |
| 3,713,689 A * | 1/1973 | Podolan et al. ........ 296/220.01 |
| 5,078,447 A * | 1/1992 | Klein et al. ............... 296/107.2 |
| 5,558,388 A * | 9/1996 | Furst et al. ............... 296/107.2 |
| 5,769,483 A | 6/1998 | Danzl et al. |
| 5,806,912 A * | 9/1998 | Ramaciotti et al. ..... 296/107.09 |
| 6,073,961 A | 6/2000 | Bailey et al. |
| 6,786,529 B2 * | 9/2004 | Hasselgruber et al. ...... 296/108 |

(Continued)

FOREIGN PATENT DOCUMENTS

EP    0 980 796    2/2000

(Continued)

*Primary Examiner*—H Gutman
(74) *Attorney, Agent, or Firm*—Salter & Michaelson

(57) ABSTRACT

A retractable roof for a vehicle comprises two telescopic tube arrangements disposed on opposite sides respectively of the roof which comprises first and second panels (1) and (2). Each arrangement comprises three tubes (7, 8 and 9) dimentioned mentioned to be telescopically received one within the other, of hollow elliptical cross-section and made of carbon fiber. Expandable bags are disposed inside tubes (7) and (8). Each bag is disposed within a braided sock made of a low friction material to control movement and diameter of the bag within the corresponding tube, and facilitate its expansion and contraction. By supplying and withdrawing pressure fluid to and from the bags, the roof may be moved between extended and contracted positions. Expandable seals are disposed between adjacent roof panels and between those panels and the front and rear screens of the vehicle.

20 Claims, 3 Drawing Sheets

U.S. PATENT DOCUMENTS

| | | | |
|---|---|---|---|
| 6,814,391 B2 * | 11/2004 | Biecker et al. | 296/108 |
| 6,877,790 B2 * | 4/2005 | Queveau et al. | 296/108 |
| 2004/0032148 A1 * | 2/2004 | Hasselgruber et al. | 296/121 |
| 2006/0038427 A1 * | 2/2006 | MacNee, III | 296/117 |

FOREIGN PATENT DOCUMENTS

GB  2367874 A * 4/2002

* cited by examiner

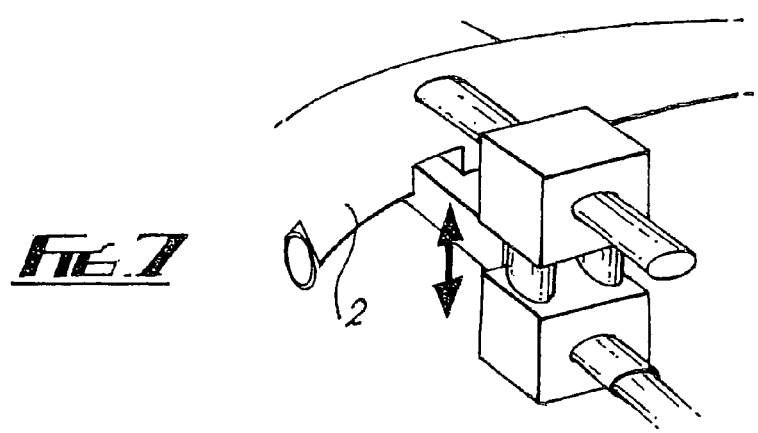
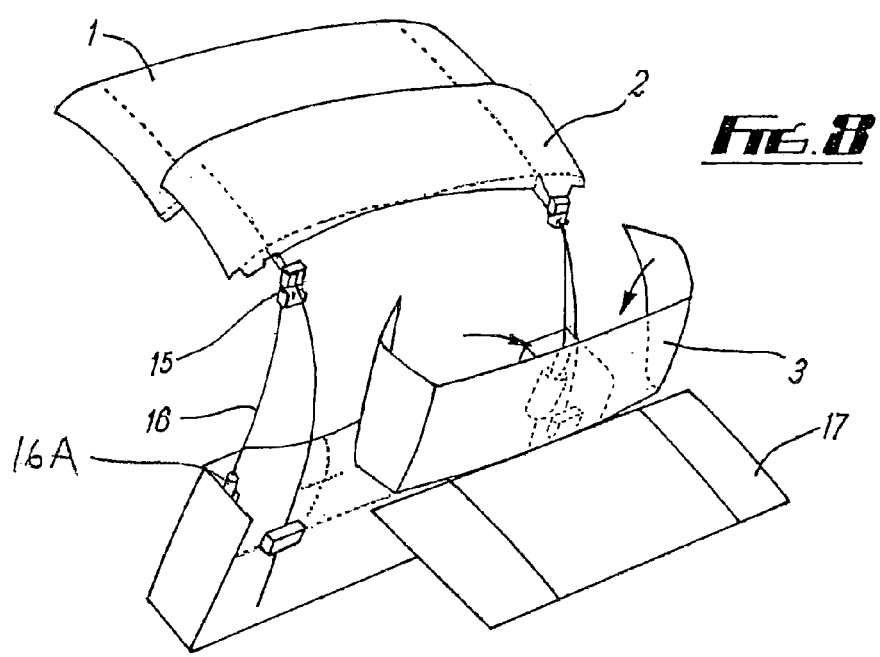
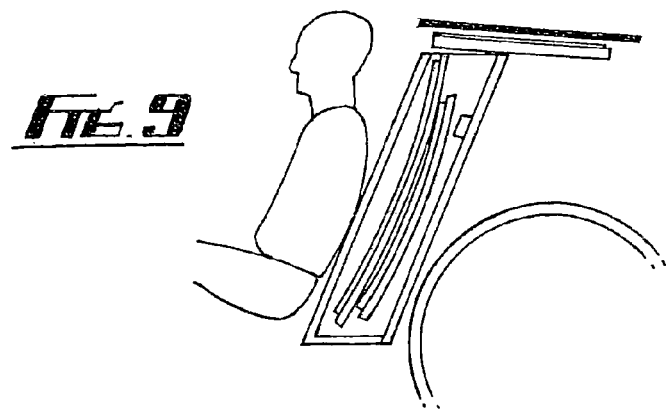

RETRACTABLE TOP FOR A VEHICLE

TECHNICAL FIELD

The present invention relates to a retractable top for a vehicle and particularly, but not exclusively, to a retractable hard top.

BACKGROUND OF THE INVENTION

Vehicles with retractable hard tops are well known. In general one or more roof panels are supported on a complex linkage. The linkage with the roof panel or panels connected to it may be moved between an extended position, in which the roof is fully extended, and a retracted position in which the roof panel or panels are stowed. Although arrangements of this nature have worked well, the reliance upon mechanical linkages leads to a number of disadvantages. They are relatively complicated and therefore expensive to construct. In use wear in the linages can lead to a deterioration in performance. Any play in the linkages can cause rattling which may be exacerbated as the speed of the vehicle increases. An object of the invention is to overcome or mitigate these disadvantages.

SUMMARY OF THE INVENTION

According to the present invention, there is provided a retractable roof for a vehicle comprising a plurality of panels, telescopic means connected to the panels for moving the panels between an extended position in which the roof is closed and a stowed position in which the roof is open, and pressure fluid supply means for supplying and withdrawing pressure fluid to and from the telescopic means to extend and withdraw the panels.

In a preferred embodiment of the invention, the telescopic means comprise individual tubes adapted to telescope into each other. The tubes are advantageously elliptical in cross section and preferably made from carbon fiber or other suitable material. There are telescopic tubes disposed on opposite sides respectively of the panels. An airbag is disposed within an individual tube of the telescopic means and disposed to receive pressure fluid from the pressure fluid supply means to extend the next adjacent tube therefrom. Conversely pressure fluid withdrawn from the airbag is operative to withdraw the next adjacent tube into the tube containing the airbag. The or each airbag is advantageously disposed within a braided envelope made of a low friction material to control the movement and dimension of the bag within the tube. Seals are provided between adjacent panels. These seals may be tubular, be pressurised when in a sealing condition and the pressure released to break the seal. Means are provided for bending the telescopic means as the means extend and for releasing the bending force to enable the means to adopt their natural unflexed state and the panels to adopt positions ready for stowage. The means for bending preferably comprise a cable connected between the telescopic means and a fixed point on the vehicle and means for reducing and extending the effective length of the cable. The C-posts of the vehicle are hinged to the rear screen and may be folded underneath the rear screen for stowage.

BRIEF DESCRIPTION OF THE DRAWINGS

In order that the invention may be more clearly understood, one embodiment thereof, will now be described, by way of example, with reference to the accompanying drawings, in which:—

FIG. 9 shows the roof of FIG. 1 in the fully stowed position.

DETAILED DESCRIPTION OF THE DRAWINGS

Figure 1:
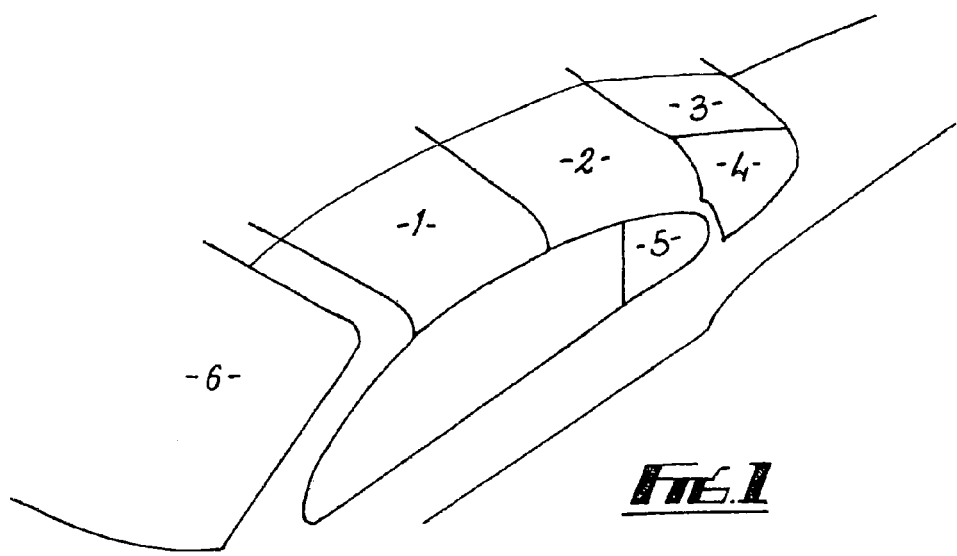
FIG. 1 diagrammatically shows a vehicle hard top roof in the closed position, FIG. 2 diagrammatically shows a cross section through the vehicle hard top roof of FIG. 1 as the roof begins to retract from the closed to the stowed position, FIG. 3 diagrammatically shows a further cross section through the vehicle hard top roof of FIG. 1 illustrating the movement of tubes forming part of the roof assembly.
Figure 2:
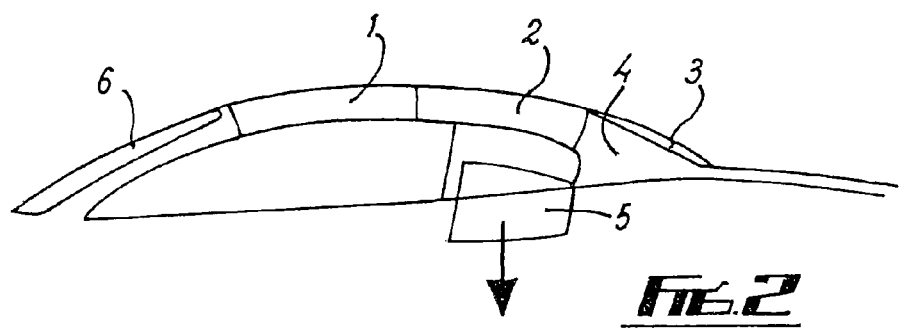
Figure 3:
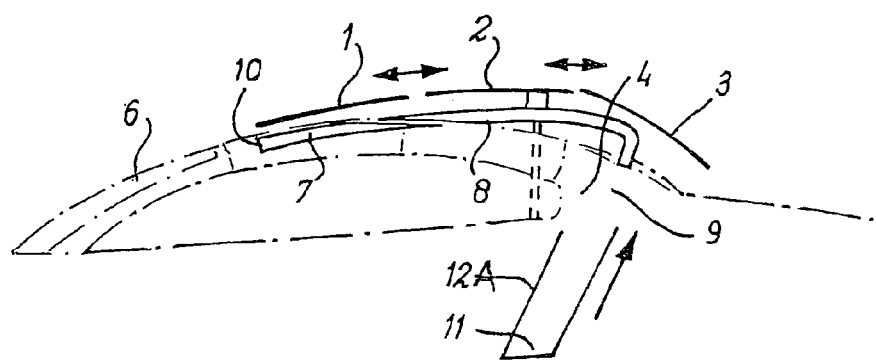

Referring to FIG. 1, the vehicle hard top roof comprises first and second roof panels 1 and 2, a rear screen 3, C-posts 4 (one side not visible) and rear quarter glasses 5 (other side again not visible). The vehicle windscreen is indicated at 6. Two telescopic tube arrangements are disposed on opposite sides respectively of the roof. Referring to FIG. 3, each arrangement comprises three tubes 7, 8 and 9 which are dimensioned to be telescopically received one within the other. In the roof closed position each tube arrangement is fully extended and the ends are constrained at points 10 and 11 on the header rail of the screen 6 and within a cavity 12A disposed between the vehicle rear seats and squab panel.

Figure 4:
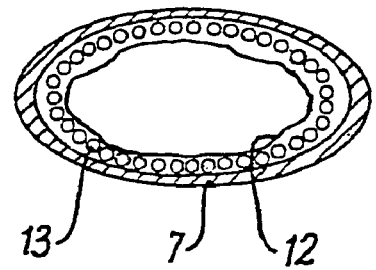
FIG. 4 is a diagrammatic cross section through one of the tubes of FIG. 3.
Figure 5:
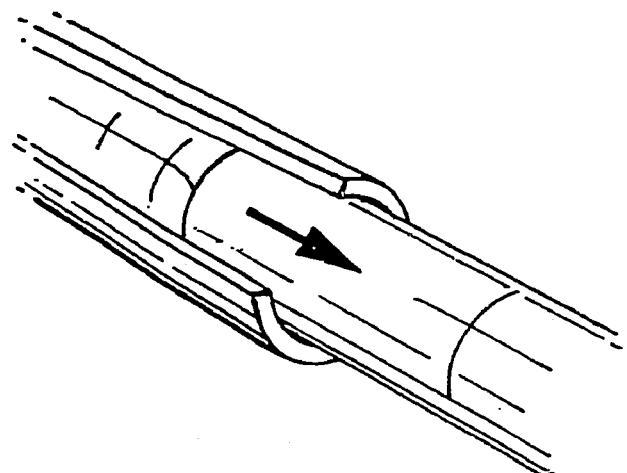
FIG. 5 is a diagrammatic detail view showing the telescopic action of two adjacent tubes.

Referring to FIGS. 4 and 5, each tube 7, 8 and 9 is of hollow elliptical cross section and is preferably made from carbon fiber or other suitable material. An expandable bag 12 is disposed inside tubes 7 and 8. Expansion of the bags may be pneumatic or hydraulic. Each bag 12 is disposed within a braided sock 13 made of a low friction material to control the movement and diameter of the bag within the corresponding tube and facilitate its expansion and contraction. FIG. 5 shows the interconnection between tubes 7 and 8. The interconnection between tubes 8 and 9 is similar, an expandable bag and associated braided sock being disposed in tube 8 operative to extend tube 9 from and retract it into tube 8.

Figure 6A:
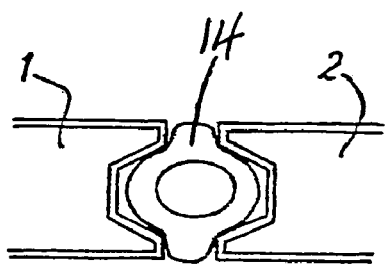
FIG. 6a is a diagrammatic detail view of a seal in an operative position between adjacent panels of the roof of FIG. 1, FIG. 6b diagrammatically shows the seal of FIG. 6a in the non-operative position, FIG. 7 diagrammatically shows a detailed view of a control block for a panel of the roof of FIG. 1, FIG. 8 diagrammatically show the hard top roof of FIG. 1 in a position between the closed and stowed positions.
Figure 6B:
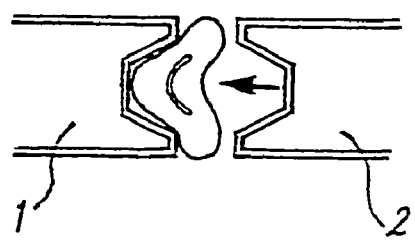

Expandable seals are disposed between the screen 6 and roof panel 1 between roof panels 1 and 2 and between panel 2 and rear screen 3. One of these seals is shown diagrammatically in FIGS. 6a and 6b between panels 1 and 2. The seal is shown in its operative sealing position in FIG. 6a and in its non-operative position in FIG. 6b. Each seal comprises a hollow tube 14 of a flexible resilient material. Air supplied to the tube under pressure forces the material of the tube against the adjacent panels 1 and 2 to produce a seal as shown in FIG. 6a. To release, the seal vacuum is applied to the tube thus pulling the tube back from one of the panels.

Control blocks 15 are used to raise panel 2 above panel 1 so that panel 1 may slide underneath panel. These control blocks are disposed on opposite sides respectively of the panel and one is shown diagrammatically in FIG. 7.

A control cable 16 is connected between control blocks 15 and the vehicle body to control flexing of the tubes 7, 8 and 9 during extension and retraction of the roof. The cable 16 holds the tubes 8 in a bowed position when the roof is in its deployed closed position.

The above described arrangement operates as follows. With the roof in its fully extended and closed position one or both rear quarter glasses are dropped to break the seal to the interior of the vehicle. Vacuum is then applied to the vacuum seals to break the seals between the roof panels and between the panels and front and rear screens. The front roof panel is unlatched from the front screen. A cover on the cavity for the stowage of the roof hinges forward and the parcel shelf 17 normally disposed above the cavity slides rearwardly. The rear screen 3 and C-posts 4 hinge rearwardly and the control blocks are operated to raise panel 2 above panel 1. As panel 2 is raised the C-posts 4 hinge inwardly under the rear screen 3. The first roof panel 1 disengages from the header rail of the screen 6. Air is removed from the airbags 12 in the tubes 7 thus pulling the first roof panel 1 rearwards as the tubes 7 side over the tubes 8. The control cable 16 extends allowing the tubes 8 to flex upwardly to their natural position. The first roof panel continues to move rearwardly until it abuts the control blocks 15. Air is then removed from the tube 8 causing tubes 7 and 8 to slide over tube 9 and roof panels 1 and 2 to be stowed in the cavity between the rear seat and the squab panel. The rear screen 3 and C-posts 4 fold forwards, the parcel shelf 17 slides forward concealing the rear screen and C-post and the stowage cover folds back down to close the stowage with the fully retracted roof inside. Deployment of the roof from this fully retracted and stowed position to the fully extended and roof closed position is the reverse of this procedure air being supplied to the bags to extend the tubes and the panels connected to them. Once the roof panels are in the correct relative extended position air can be supplied to the seals between panels to make the seals between adjacent panels and between the panels and adjacent screens.

The above described arrangement enables the natural flexibility of carbon fiber to be utilized in combination with the advantages of a pneumatic or hydraulic extension and retraction system to provide an effective and reliable solution.

It will be appreciated that the above embodiment has been described by way of example only and that many variations are possible without departing from the scope of the invention.

The invention claimed is:

1. A retractable roof for a vehicle comprising a plurality of panels, telescopic means connected to the panels for moving the panels between an extended position in which the roof is closed and a stowed position in which the roof is open, and pressure fluid supply means for supplying and withdrawing pressure fluid to and from the telescopic means to extend and withdraw the panels.

2. A retractable roof as claimed in claim 1, in which the telescopic means comprise individual tubes adapted to telescope into each other.

3. A retractable roof as claimed in claim 2, in which the tubes are elliptical in cross section.

4. A retractable roof as claimed in claim 2, in which the tubes are made from carbon fiber.

5. A retractable roof as claimed in claim 2, in which the telescopic means comprise tubes disposed on opposite sides respectively of the panels.

6. A retractable roof as claimed in claim 1, in which the telescopic means comprise tubes disposed on opposite sides respectively of the panels.

7. A retractable roof as claimed in claim 1, in which an airbag is disposed within an individual tube of the telescopic means and disposed to receive pressure fluid from the pressure fluid supply means to extend the next adjacent tube therefrom.

8. A retractable roof as claimed in claim 7, in which the airbag is disposed within an envelope.

9. A retractable roof as claimed in claim 8, in which the envelope is made of a low friction material to control movement and dimension of the bag within the tube.

10. A retractable roof as claimed in claim 7, in which seals are provided between adjacent panels.

11. A retractable roof as claimed in claim 7, in which means are provided for bending the telescopic means as the means extend and for releasing the bending force to enable the telescopic means to adopt their natural un-flexed state.

12. A retractable roof as claimed in claim 11, in which control means are provided to enable one panel to be raised above the next adjacent panel so that the raised panel may slide over the adjacent panel.

13. A retractable roof as claimed in claim 1, in which seals are provided between adjacent panels.

14. A retractable roof as claimed in claim 13, in which the or each seal is tubular.

15. A retractable roof as claimed in claim 14, in which the or each seal is pressurized to place it in a sealing condition and depressurized to break the seal.

16. A retractable roof as claimed in claim 1, in which means are provided for bending the telescopic means as the means extend and for releasing the bending force to enable the telescopic means to adopt their natural un-flexed state.

17. A retractable roof as claimed in claim 16, in which the means for bending comprises a cable adapted to be connected between the telescopic means and a fixed point on the vehicle and means for reducing and extending the effective length of the cable.

18. A retractable roof as claimed in claim 1, in which control means are provided to enable one panel to be raised above the next adjacent panel so that the raised panel may slide over the adjacent panel.

19. A retractable roof as claimed in claim 18, in which the control means comprise control blocks disposed on opposite sides respectively of the panels.

20. A vehicle comprising a retractable roof as claimed in claim 1.

* * * * *